J. W. H. DEW.
PROCESS OF MANUFACTURING WATERPROOF SHEETING AND THE LIKE.
APPLICATION FILED DEC. 30, 1912.

1,236,685.

Patented Aug. 14, 1917.

Inventor:
J. W. H. Dew

Attorneys

UNITED STATES PATENT OFFICE.

JAMES WALTER HENRY DEW, OF LONDON, ENGLAND.

PROCESS OF MANUFACTURING WATERPROOF SHEETING AND THE LIKE.

1,236,685.  Specification of Letters Patent.  Patented Aug. 14, 1917.

Application filed December 30, 1912. Serial No. 739,404.

*To all whom it may concern:*

Be it known that I, JAMES WALTER HENRY DEW, a subject of the King of Great Britain and Ireland, and residing at 8 Laurence Pountney Hill, Cannon street, in the county of London, England, have invented certain new and useful Improvements in the Process of Manufacturing Waterproof Sheeting and the like, of which the following is a specification.

This invention relates to waterproof sheeting, hose-pipe, tubing and the like of the kind which is composed of layers of unwrought fibers laid parallel to one another and combined and maintained in position by means of rubber or rubber-like substance.

The object of the present invention is to overcome certain disadvantages incident to the manufacture of such articles as hitherto proposed due to insufficient impregnation of the fibers and the invention is distinguished from the methods or processes hitherto adopted by building the article or material to be produced from any suitable number of basic strips of fiber and rubber and rubber-like substances approximately of the thickness of a single fiber.

In the accompanying drawing, which illustrates this improved process:

Figure 1:
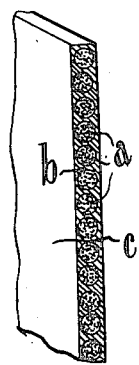
Figure 1 represents an enlarged detail perspective sectional view of the elemental strip.
Figure 2:
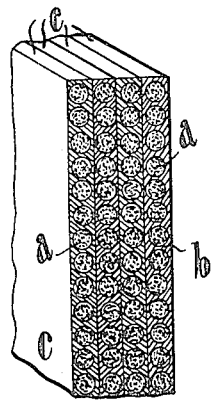
Fig. 2 is a similar view of the product formed by the union of a plurality of elementary strips.

In carrying my invention into effect when forming waterproof sheeting I take suitable unwoven fibers *a* and after having cleaned and prepared them in any usual or desired manner I cause the fibers to be laid side by side in such a manner as to be carried in the direction of their long axes so as to produce a strip *c* of any desired width and approximately only one fiber thick, and these strips *c* I cause to be passed through a rubber solution or solution of synthetic rubber or rubber compounds or any rubber-like substance *b* in such a manner as to thoroughly impregnate and to entirely envelop the fibers in a thin covering of the rubber or rubber-like substance. These strips *c* may be made of any desired width and may be laid side by side in one direction until a sheet of required size is produced and for thicker or stronger sheets a double thickness with fibers laid at right angles to the former is used, or I might build up the sheet from any number of said strips or sheets laying the fibers on the cross or in any suitable direction to produce the strength required.

I do not limit myself to any particular fiber or fibers whether selected from either the animal or vegetable kingdom, as I may employ rhea, ramie, flax, hemp, cotton or other fibers or camel or other suitable hair or wool according to varying practical requirements, but I preferably select such fibers as are capable of resisting the action of water or weak acids.

The sheeting produced in the above manner, being absolutely waterproof and very thin and light, is capable of being used for any purpose where waterproof sheeting is at present applicable and appears to be entirely suitable for tarpaulins, military ground bed sheets, wings of flying machines, waterproof garments, hot water bottles or for making up into any of the numerous articles for which rubber sheeting is usually employed. Thus I have found that strips prepared according to the present invention are entirely suitable for the manufacture of hose pipe, tubing or the like.

In the ordinary method of manufacturing hose pipe to withstand internal pressure one or more layers of fabric or plies of canvas are inserted either between an inner and outer coating of rubber or surround the rubber as an outer layer or cover to prevent bursting but it is found in time that tubes constructed in this manner particularly when used for liquids, become weak owing to the moisture percolating through the thin facing coat of rubber and rotting and destroying the fabric. Further, the rubber coatings are apt to become disintegrated owing to the defects inseparable from a canvas strengthened or reinforced hose pipe, which defects are entirely removed by my improved method of construction.

In order to build up hose pipe by this method I take strips of sheeting prepared in the manner above set forth and cause the same to be wound upon a mandrel or former in a spiral or helical manner preferably so that the edges of the strip overlap each other with every complete turn and in this manner the first layer of any length of hose pipe is formed. The second layer is super-imposed upon the first by winding it thereon in a similar manner but in the reverse direction and in this way I am enabled to build up a tube or pipe of any desired thickness by employing a sufficient number of such layers.

It will be seen that as the fibers $a$ in the strip $c$ are laid lengthwise and as fibers such as rhea, or ramie are very long in staple and extraordinarily strong, an armor-like construction of tremendous strength is produced for resisting internal pressure while the material is also impervious to moisture and the particular fibers above mentioned, being non-hygroscopic, are seen to be particularly suitable for this purpose.

The tubing produced in the above manner is vulcanized or cured by any of the usual methods and where necessary or thought desirable a complete outer covering of rubber or other protective armor may be added or a thin internal coating of rubber or the usual internal armoring could also be added as and where necessary.

I do not desire to limit the application of my invention to any particular purpose for which my improved sheeting may be employed nor to any particular form of tubing or hose pipe or to the particular purpose or medium for which it is to be employed, and I do not confine myself to any one method of incorporating or covering the fibers with the rubber-like substance.

Having now described my invention what I claim as new and desire to secure by Letters Patent is:—

1. A process of producing a water proof fabric which consists in forming a sheet from unspun fibers and rubber or rubber like substance, the sheet being approximately one fiber thick, and with all the fibers laid lengthwise and substantially parallel to one another.

2. A process for the manufacture of waterproof sheeting and the like, which consists in forming a number of strips of unspun fibers and rubber or rubber-like substance approximately one fiber thick and building up the fabric to the required thickness from a number of such strips superposed one upon the other.

3. A process for the manufacture of waterproof sheeting and the like which consists in forming a number of strips of unspun fibers and rubber or rubber like substance approximately one fiber thick and having all the fibers laid lengthwise and substantially parallel to one another and building up the fabric to the required thickness from a number of such strips superposed one upon the other.

4. A process of the character described which consists in forming a number of sheets of unspun fibers approximately one fiber thick with the fibers laid lengthwise and parallel to one another and having their ends overlapping in the direction of their length, impregnating said sheets with rubber or rubber like substance, superimposing a plurality of said sheets one upon another and subsequently vulcanizing the whole.

In testimony whereof I have signed my name to this specification in the presence of two subscribing witnesses.

JAMES WALTER HENRY DEW.

Witnesses:
   WILLIAM BARTON,
   ETHEL BURN.